UNITED STATES PATENT OFFICE.

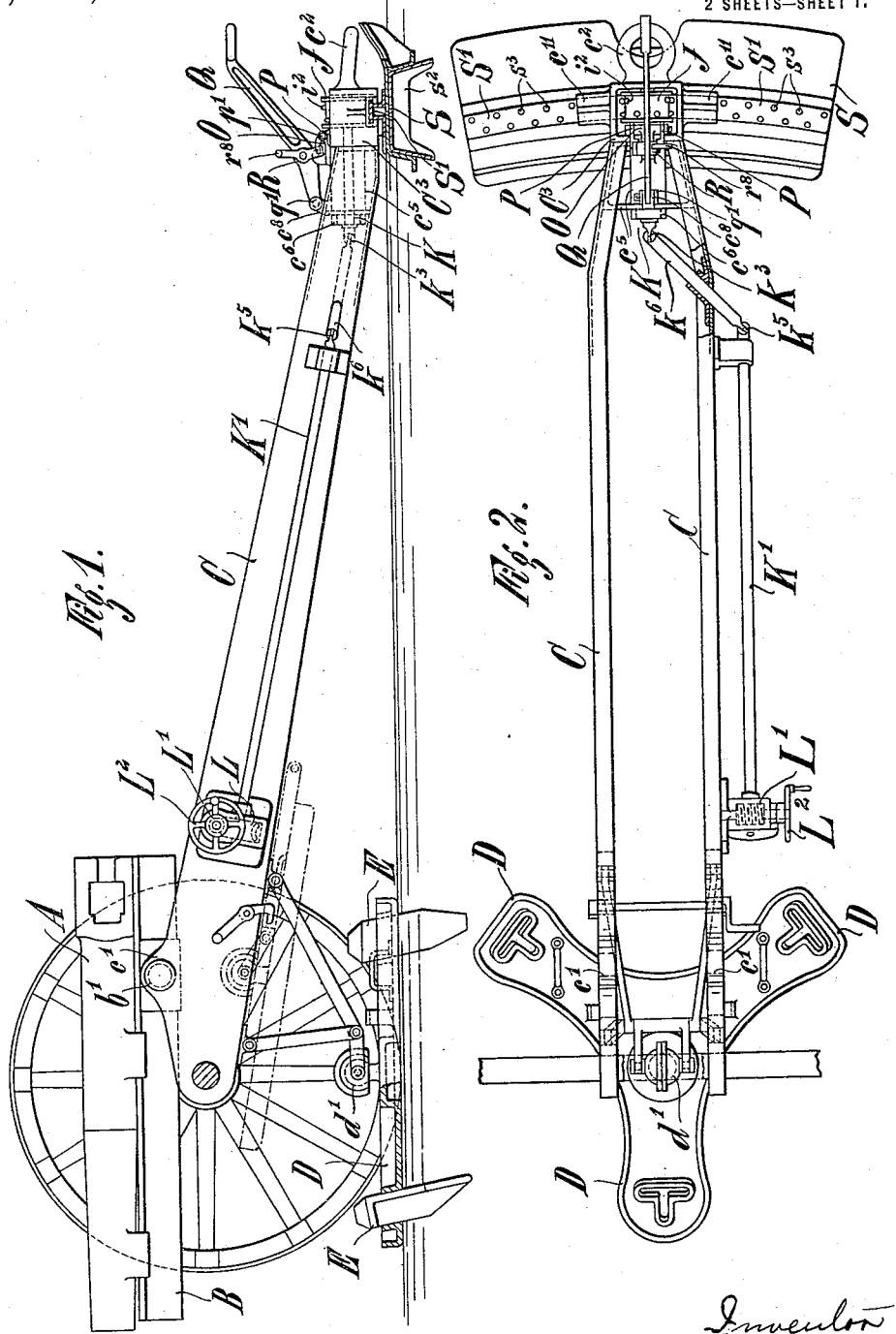

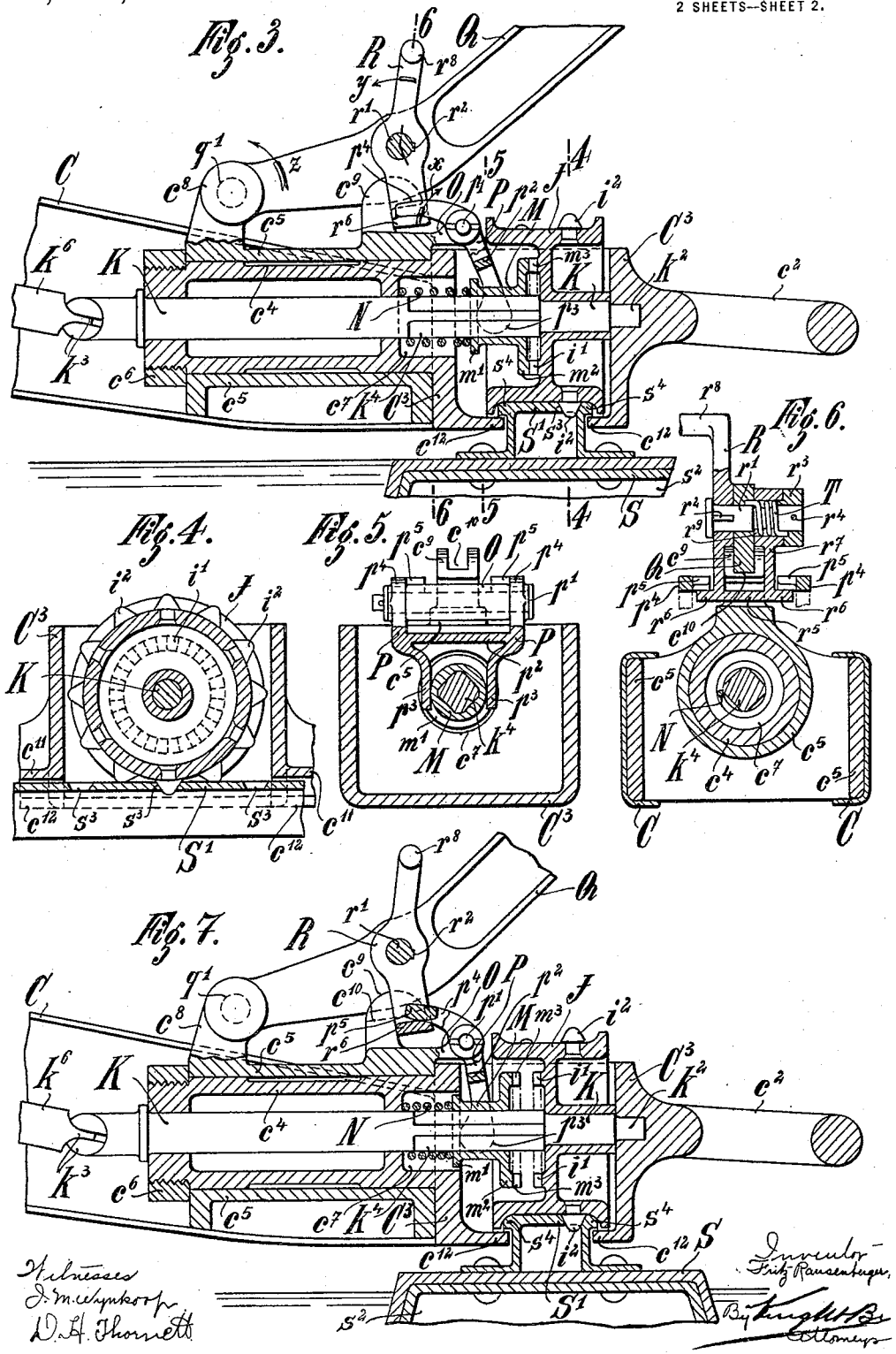

FRITZ RAUSENBERGER, OF ESSEN-ON-THE-RUHR, GERMANY, ASSIGNOR TO FRIED. KRUPP AKTIENGESELLSCHAFT, OF ESSEN-ON-THE-RUHR, GERMANY.

TRAINING-GEAR FOR MOBILE ARTILLERY.

1,173,215.

Specification of Letters Patent. Patented Feb. 29, 1916.

Application filed May 22, 1913. Serial No. 769,319.

*To all whom it may concern:*

Be it known that I, FRITZ RAUSENBERGER, residing at Essen-on-the-Ruhr, Germany, a subject of the Emperor of Germany, have invented a certain new and useful Improvement in Training-Gears for Mobile Artillery, of which the following is a specification.

The subject matter of the present invention resides in a training gear for mobile artillery, and more particularly for guns used in firing at air ships.

One embodiment of the invention is illustrated in the accompanying drawings where—

Figure 1 shows a side view of the gun mount partly in section; Fig. 2 a top plan view of Fig. 1, with some of the parts left out; Fig. 3 a length section of some of the details on larger scale; Figs. 4, 5 and 6 are transverse sections of Fig. 3 along lines 4—4, 5—5 and 6—6 respectively and Fig. 7 is a similar view to Fig. 3 with the parts in different positions.

The gun barrel A, Fig. 1, is mounted to slide on the slide carrier B, which is provided with horizontal trunnions $b^1$, carried in bearings $c^1$ in the trail body C, and may be rocked about the axis of these trunnions by means of an elevating gear, not shown in the drawing.

The following arrangement is provided to train the gun mount around the ball joint carried by the foundation plate D (Figs. 1 and 2), which is anchored to the ground by means of wedges E, Fig. 1: The rear end of the trail body, carrying the trail eye $c^2$ forms a separate roller carrier $C^3$, which is constructed to receive a roller J and engages by means of a horizontal, longitudinal trunnion $c^4$, with a bearing $c^5$, rigidly mounted in the trail end. The roller carrier $C^3$ rests with a vertical surface against the rear face of the bearing $c^5$; at the free end of the trunnion $c^4$ is moreover secured a nut $c^6$ which impinges against the forward face of the bearing $c^5$. In consequence of this arrangement the roller carrier $C^3$ is prevented from any displacement relative to the trail body.

The roller J is revolubly mounted on a shaft K, see Figs. 1, 2, 3, 4 and 7, which at one end is carried in the roller carrier $C^3$, by means of a journal $k^2$, see Figs. 3 and 7, and at the other end rests in a bearing in the free end of the trunnion $c^4$. The shaft K is connected through a shaft $k^6$, a universal joint $k^3$ and a second universal joint $k^5$ with a shaft $K^1$, see Figs. 1 and 2. The shaft $K^1$ carries at its forward end, which rests in a bearing in the trail body, a worm wheel L in mesh with a worm $L^1$ the shaft of which is carried in a bearing on the trail body and is provided with a hand wheel $L^2$. To connect the shaft K with the roller J is provided a muff M, see Figs. 3, 5 and 7, which is slidably but non-revolubly mounted on a square part $k^4$ of the shaft K. The muff M is provided with two collars $m^1$ and $m^2$, of which the one $m^2$ has teeth $m^3$ constructed to engage with corresponding teeth $i^1$ on the roller J. In a recess $c^7$ in the trunnion $c^4$ of the roller carrier $C^3$ is arranged a spring N around the shaft K, which spring at one end impinges against the muff M, and at the other end against the bottom of the recess $c^7$ tending to keep the teeth $m^3$ of the muff in engagement with the teeth $i^1$ of the roller J.

For the purpose of disengaging the coupling between the shaft K and the roller J through the muff M, there is provided an elbow P mounted in a bearing piece O by means of a journal $p^1$ on the bearing $c^5$. This elbow has two arms $p^4$ forming an upper fork and two arms $p^2$, forming a lower fork, the latter arms $p^3$ being connected with each other by means of a cross piece $p^2$, see for instance Fig. 5. The fork $p^3$ grips the muff M and abuts against the collar $m^1$. The fork $p^4$ of the elbow P is provided with inwardly directed fingers $p^5$, see Figs. 5, 6 and 7. The hand spike Q of the carriage, journaled on a bolt $q^1$ in a pair of eyelets $c^8$ provided on the bearing $c^5$, rests in its working position in a recess $c^{10}$ between claws $c^9$ on the bearing $c^5$, see Figs. 5, 6 and 7, and the hand spike is provided with a revoluble lever R journaled on a bolt $r^1$. The lever R grips over the hand spike Q like a fork and is provided with a sidewardly projecting stud $r^8$. The bolt $r^1$ is prevented from turning relative to the lever R by means of a key $r^2$, and also secured against longitudinal displacement by means of a washer $r^3$ with a cotter pin $r^4$, see Fig. 6. The lever R has a step $r^5$ and outwardly directed fingers $r^6$ which are constructed to engage under the fingers $p^5$ of the fork $p^4$ on the elbow P, thus coöperating therewith. In a boring $r^9$, provided in the fork arm $r^7$ of the lever R, see Fig. 6, is situated a spring T surrounding the bolt $r^1$ and one end of this spring engages with the hand spike Q and the other end with the washer $r^3$. This spring tends to hold the lever R in the position represented in Figs. 1, 3 and 7, wherein the step $r^5$ abuts against the claw $c^9$.

The roller J is intended to run on a rail $S^1$ seated on a bed-plate S, which grips the ground by means of ribs $s^2$. The rail $S^1$ runs concentric with the ball joint $d^1$, when the bed-plate S and the foundation plate D are situated in the working position relative to the gun mount, shown in Figs. 1 and 2, and has flanges $s^4$, see Figs. 3 and 7, which engage under flanges $c^{12}$ arranged on sideward projections $c^{11}$ of the roller carrier $C^3$. In the rail $S^1$ are provided holes $s^3$, see Figs. 2 and 4, which are adapted to engage studs $i^2$ on the roller J in the manner of a pin gear.

In the firing position of the gun, the foundation plate D is anchored to the ground by means of the wedges E; the trail body C rests with the roller J on the rail $S^1$ of the bed-plate S inserted in the ground, and the shaft K is coupled to the roller J through the muff M in coöperation with the teeth $m^3$ $i^1$. By turning the hand wheel $L^2$, the gun mount may be trained around the ball joint $d^1$. The roller J will then run on the rail $S^1$, and the studs $i^2$ of the roller enter one after the other of the holes $s^3$ of the rail. In consequence of the described swinging connection of the bed-plate S with the trail C and therefore with the wheel axle of the mount, the mount can also be shifted on uneven ground (especially on ground where the wheel axle is inclined relatively to the bed-plate) without causing the bed-plate to change its position on the ground, during the swinging of the mount.

If it should be desired to train the gun mount rapidly independently of the hand wheel $L^2$, the coupling between the shaft K and the roller J is disengaged. For this purpose the hand spike Q will be raised, when the elbow P will turn around the bolt $p^1$, in the direction of the arrow $x$, see Fig. 3, under the coöperation of the fingers $p^5$, and the fingers $r^6$ of the lever R connected to the hand spike Q. The fork $p^3$ of the elbow P then brings the muff M against the action of the spring N out of engagement with the roller J, see Fig. 7. This movement of the elbow P and the muff M is limited through a step $r^5$ of the lever R taking up its position under the claw $c^9$ arranged on the bearing $c^5$. When the gun mount is trained, after disengaging the coupling $m^3$ $i^1$, the roller J will run loose on the shaft K.

When the roller J, during the training of the mount, arrives at the end of the rail $S^1$, the coupling $m^3$ $i^1$ is disengaged in the above described manner and the trail body is raised by means of the hand spike Q in coöperation with the lever R and the claw $c^9$. The bed-plate S is then lifted together with the trail body through the flanges $s^4$ of the rail $S^1$ engaging the flanges $c^{12}$ of the roller carrier $C^3$. The bed-plate S will thereupon be displaced relatively to the trail body and the roller carrier $C^3$, in the direction in which the further training of the gun mount is going to take place, and the displacement is continued until the other end of the rail $S^1$ is situated below the roller J. During the displacement of the bed-plate, the roller will turn on the shaft K; lastly the trail body is again laid down on the ground and the hand spike Q set free. The spring N will return the muff M and the lever P into the position, wherein the coupling $m^3$ $i^1$ is engaged. To accomplish this engagement, when the teeth $m^3$ of the muff do not register between the teeth $i^1$ of the roller J, a slight turning of the muff M will be required by means of the hand wheel $L^2$.

Before limbering up, the hand spike Q has to be turned in a direction of the arrow $z$, see Fig. 3. To make this possible, the lever R has to be turned by means of its projection $r^8$ against the action of the spring T in the direction of the arrow $y$, see Fig. 3, until the fingers $r^6$ are disengaged from the fingers $p^5$ of the lever P. The hand spike will then be free to turn on its bolt $q^1$. The bed-plate S hangs, during transportation of the gun mount, on the flanges $c^{12}$ of the rail carrier $C^3$ and is thereby retained in its middle position on the roller carrier $C^3$ or the trail body C by means of an anchoring device of any known construction, but which has not been shown in the drawing.

The described device may evidently be applied to guns provided with training gear for finer side adjustment of the gun on the trail.

I claim:

1. Training gear for gun mounts, having a bed-plate, a slide on the trail end in engagement with said bed-plate, connections between said slide and the trail end permitting oscillation of said slide around an axis situated in the length direction of the trail; means for giving lateral displacement of the trail relative to the bed-plate around a vertical axis through the wheel axle, said means comprising a roller, mounted to revolve around said axis of oscillation, said roller engaging with said bed plate.

2. Training gear for gun mounts, having a bed-plate, a carrier on the trail end for said bed-plate, connections between said carrier and the trail end permitting oscillation of said carrier around an axis situated in the length direction of the trail; means for giving lateral displacement of the trail relative to the bed-plate around a vertical axis through the wheel axle, said means comprising a roller having radial studs and corresponding apertures in the bed-plate, a shaft in the carrier coaxial with said axis of oscillation of the carrier, said roller being loosely mounted on said shaft.

3. Training gear for gun mounts, having a bed-plate, a carrier on the trail end for said bed-plate, connections between said carrier and the trail end permitting oscillation of said carrier around an axis situated in the length direction of the trail; means for giving lateral displacement of the trail relative to the bed-plate around a vertical axis through the wheel axle, said means comprising a roller having radial studs and corresponding apertures in the bed-plate, a shaft in the carrier coaxial with said axis of oscillation of the carrier, said roller being loosely mounted on said shaft, a hand wheel on the trail for turning said shaft and a clutch for throwing said roller in and out of engagement with said shaft.

4. Training gear for gun mounts, having a bed-plate, a carrier on the trail end for said bed-plate, connections between said carrier and the trail end permitting oscillation of said carrier around an axis situated in the length direction of the trail; means for giving lateral displacement of the trail relative to the bed-plate around a vertical axis through the wheel axle, said means comprising a roller having radial studs and corresponding apertures in the bed-plate, a shaft in the carrier coaxial with said axis of oscillation of the carrier, said roller being loosely mounted on said shaft, a hand wheel on the trail for turning said shaft, and a clutch for throwing said roller in and out of engagement with said shaft, said clutch being actuated by the hand spike for disconnecting the clutch.

5. Training gear for gun mounts, having a bed-plate, a carrier on the trail end of said bed-plate, connections between said carrier and the trail end permitting oscillation of said carrier around an axis situated in the length direction of the trail; means for giving lateral displacement of the trail relative to the bed-plate around a vertical axis through the wheel axle, said means comprising a roller having radial studs and corresponding apertures in the bed-plate, a shaft in the carrier coaxial with said axis of oscillation of the carrier, said roller being loosely mounted on said shaft, a hand wheel on the trail for turning said shaft, and a clutch for throwing said roller in and out of engagement with said shaft, said clutch comprising a muff slidably but non-revolubly mounted on said shaft, opposing teeth on the muff and on the roller, and a spring tending to keep said teeth in engagement.

6. Training gear for gun mounts, having a bed-plate, a carrier on the trail end for said bed-plate, connections between said carrier and the trail end permitting oscillation of said carrier around an axis situated in the length direction of the trail; means for giving lateral displacement of the trail relative to the bed-plate around a vertical axis through the wheel axle, said means comprising a roller having studs and corresponding apertures in the bed-plate, a shaft in the carrier coaxial with said axis of oscillation of the carrier, said roller being loosely mounted on said shaft, a hand wheel on the trail for turning said shaft, and a clutch for throwing said roller in and out of engagement with said shaft, a lever mounted to oscillate in the trail end, said lever engaging said muff, a hand spike journaled to rock in the longitudinal plane of the trail, and a member connecting the hand spike with said lever, whereby, on raising said hand spike, said clutch will be disconnected.

7. Training gear for wheeled gun mounts, comprising a bed-plate for the trail, a sliding connection between said trail and said bed-plate and a connection between said trail and said bed-plate, permitting oscillation of the bed-plate around an axis situated in the direction of the length of the mount; said sliding connection comprising means adapted to hold together said trail and said bed-plate when the trail is raised.

The foregoing specification signed at Barmen, Germany, this 9th day of May, 1913.

FRITZ RAUSENBERGER. [L. S.]

In presence of—
 HELEN NUFER,
 ALBERT NUFER.

Copies of this patent may be obtained for five cents each, by addressing the "Commissioner of Patents, Washington, D. C."